United States Patent Office 2,847,279
Patented Aug. 12, 1958

2,847,279

METHOD FOR OBTAINING IRON-FREE ALUMINUM COMPOUND FROM CLAYS

Stanley Tucker, Collingdale, Pa.

No Drawing. Application May 25, 1955
Serial No. 511,118

5 Claims. (Cl. 23—102)

This invention relates to the recovery of iron-free aluminum compound from clays and low grade bauxites.

While not found free in nature, aluminum is one of the most abundant of the earth's elements, comprising about 7.8% of the lithosphere. It is most often found as a silicate, as in clays. It is also found in feldspars (as $K_2Al_2SiO_6$), in cryolite ($Na_3AlF_6$), and in bauxite as a hydrated aluminum oxide ($Al_2O(OH)_4$). While some bauxite of commercial value is found in the United States, the bulk of the American aluminum industry relies on foreign sources.

At the present time high silica clays are not being commercially used as a source of this metal. The recovery of aluminum from bauxite by the Hall process and the more modern commercial methods, such as the Bayer process, comprises in each instance, an alkaline recovery method, and requires a raw material having a low silica content. As a practical matter an excess of more than about 5 percent of combined silica, renders a bauxite undesirable for present day alkaline commercial aluminum recovery methods, although the so-called "Combination Process" developed during World War II can be utilized for treating low grade bauxites containing up to about 15 weight percent silica. Even the combination process cannot be used for clays, which normally contain a much high percentage of silica.

Acid processes for the separation of alumina from clays and high silica-containing bauxites have been suggested, but have so far proved to be impracticable. Thus, while silica and even titania, may be readily separated from alumina, as both of these impurities are not dissolved by strong acids, such as sulfuric acid; it has not yet been commercially feasible to secure a quantitative separation of iron oxide from alumina by prior suggested acid processes. Commercial alumina must contain less than 0.05 percent iron oxide. Because of the chemical similarity of properties between iron salts and aluminum salts, the difficulty of this separation has prevented an acid-type method from being adopted, although some acid-type methods have been suggested.

One acid-type method that has heretofore been proposed contemplates the dissolution of the iron and aluminum components of kaolin in a very concentrated solution of hydrochloric acid, such as 6 molar hydrochloric acid solution followed by selective liquid extraction of the iron components with an organic solvent which is insoluble in concentrated acid.

The aforesaid acid-type method has not proved practical for many reasons. Thus, not only is hydrochloric acid relatively expensive; but moreover, it is highly corrosive to iron equipment and its use would require expensive and elaborate equipment.

An object of the present invention is the provision of an acid-type method for the separation of the iron and aluminum components of a clay or high silica bauxite in which substantially quantitative separation between the iron and aluminum components may be effected.

A further object is the provision of an acid-type method for the separation of the iron and aluminum components of a clay or high silica bauxite in which the separation is effected at slightly acid or substantially neutral conditions.

Another object of the present invention is the provision of a method for the recovery of pure iron-free aluminum compound.

A still further object of the present invention is the provision of a method for obtaining a source of pure iron.

In the process of the present invention a raw kaolin, such as a Georgia kaolin containing about 0.10% $Fe_2O_3$, although clays having higher or lower concentrations of iron may be used, is roasted at an elevated temperature, such as about 600 to 800° C. for a short period of time. It has been found that such preliminary roasting renders the clay more soluble in dilute acids, although the optimum roasting temperature varies with different clays; too high a roasting temperature renders the clays insoluble in dilute acids, too low a roasting temperature fails to render the clay into a form which may be readily dissolved in acid.

The roasted kaolin is then contacted with acid. Preferably, the initial contact is with a dilute solution of a strong mineral acid, such as between about 1–3 molar solution of nitric acid.

The preferred acids of my invention are nitric and sulfuric, most preferably the former. Nitric acid is a strong mineral acid, and is an oxidizing agent that will convert ferrous ions to ferric ions. As will be more fully developed below, the present invention is of utility with ferric iron and the use of nitric acid assures that the iron will be in this form.

The nitric acid concentration is not critical and may range over a broad range, as from substantially zero normal to 5 normal and beyond. A preferred range is 0.1 to 5 normal nitric acid. As a practical matter the concentration should be high enough to dissolve appreciable amounts of aluminum and iron from the clay being treated. The separation of iron from aluminum in accordance with the present invention is favored when the acidity is increased. Although I do not wish to be bound by any theory, I believe that the presence of hydrogen ions serves to maintain the iron in the desired ferric ion state and unhydrolyzed.

Halide acids, such as hydrochloric acid, may be used in the process of my invention, but in general are not to be preferred, as they are generally more expensive than a combination of non-halide acids and halide salts. Moreover, halide acids are non-oxidizing acids, and will not convert ferrous to ferric ions.

Preferably, the roasted clay is slurried in the nitric acid for a length of time sufficient to leach the iron and aluminum components from the clay. Silica and titania are both substantially insoluble in dilute nitric or sulfuric acids and may be readily separated therefrom by filtration, as with a filter press, or the like. The filtered silica and/or titania may be discarded.

It is essential for the purposes of this invention that prior to, or at the time of the extraction, as explained below, a water-soluble metal halide salt, or a water-soluble halide salt or other source of halide ions which decomposes electrolytically be added to the leach liquor. I have successfully employed a variety of halide salts and compounds. Among these are: chloride salts such as sodium chloride, potassium chloride, ammonium chloride, calcium chloride, barium chloride and lithium chloride; bromide compounds, such as sodium bromide and potassium bromide; iodide salts such as sodium iodide and potassium iodide; fluoride salts such as sodium fluoride and ammonium bifluoride. At the present time calcium chloride is preferred, this salt comprises an excellent source of chloride ions, is readily dissolved in dilute nitric acid, and is low in cost. It is advantageous to add an excess of calcium chloride so as to leave undissolved salt, in order to insure saturated conditions.

Subsequent to the addition of the inorganic halide salt to the dilute acid, the leach liquor is passed to a countercurrent extractor or one or more batch extractors for separation of the iron component from the aluminum.

For the extraction of a nitric acid leach liquor containing dissolved iron and aluminum, a variety of oxygen-containing organic solvents, which are insoluble in water and which form complex chloride-containing salts with iron may be used, including water-insoluble esters, ketones, alcohols, ethers, aldehydes and organic acids. Examples of such compounds include amyl alcohol, ethylene glycol ethyl ether acetate, methyl amyl acetate, ethyl butyl ketone, acetophenone, diisobutyl ketone, 2-ethyl hexyl acetate, carbitol acetate, n-amyl alcohol, methyl amyl alcohol, nonyl acetate, and diisobutyl carbinol.

Halogen-containing organic solvents may also be used in the process of the present invention. Examples of such solvents include carbon tetrachloride, chloroform, phenyl fluoride, o-dichlorobenzene, etc.

The preferred solvent for the process of the present invention is methyl isobutyl ketone, and to a slightly lesser extent methyl butyl ketone. Thus, methyl isobutyl ketone and methyl butyl ketone possess a far higher selective activity for the dissolution of ferric ions in the presence of halide ions than other solvents. Moreover, neither aluminum chloride nor other soluble aluminum compounds are withdrawn from aqueous solutions by these solvents.

The solvent stream containing the ferric complex is easily separated from the aqueous stream containing aluminum, since these are substantially immiscible in one another.

By adding the water-soluble halide salt to the extractor, corrosion of equipment due to the formation of a substantial amount of hydrochloric acid is prevented. Thus, the ferric ions rapidly form a complex with the halide ions, and the oxygen atom of the organic solvent, which complex withdraws the halide ions from the aqueous solution.

I have determined that virtually a quantitative separation of iron using methyl isobutyl ketone may be accomplished from substantially neutral aqueous solutions containing no free hydrochloric acid in the presence of excess calcium chloride.

However, in the absence of halide ions, such as chloride anions, selective dissolution of ferric ions in methyl isobutyl ketone from a dilute nitric acid solution is not feasible. Thus, ferric nitrate is substantially insoluble in methyl isobutyl ketone.

Recovery of the solvent and separation of the ferric complex can be accomplished by first scrubbing the solvent with water and then crystallizing out the ferric salt, preferably followed by precipitation of the iron with alkali. By reusing the water, loss of solvent due to water-solubility may be minimized. Pure iron which is free from contaminants usually found with iron derived from other sources may then be obtained by reducing the ferric salt with hydrogen. Alternatively, pure iron sulfide may be obtained by contacting the ferric salt with hydrogen sulfide.

The aluminum in the dilute acid solution may be separated by crystallization or precipitation. The primary contaminants associated with the separated alumina will be any excess of halide compounds or ions not contained in the solvent complex. Such contaminants may be separated from the aluminum compound by conventional technique, or may remain in the aluminum compound during the electrolytic processing as a supplementing electrolyte to obtain pure aluminum.

Example 1

Extractions in accordance with the present invention, except that halide ions were excluded, were conducted with solvent mixtures of methyl isobutyl ketone and isopropyl ether as the extracting agent in various proportions and with the concentration of nitric acid being varied from zero to 8 molar concentration. In the absence of halide ions, it was impossible to detect any extraction whatsoever of iron from nitric acid solutions in which iron was present in a concentration of 11.2 grams of iron per liter of solution.

Example 2

In each of the following experiments ferric nitrate was extracted by methyl isobutyl ketone from solutions of ammonium chloride and nitric acid.

| $HNO_3$ Molarity | Cl Conc., gms./liter | Fe Conc., Original | gms./liter, Final | Percent Extracted |
|---|---|---|---|---|
| 0 | 178 | 21.4 | 17.5 | 18.2 |
| 0.8 | 169 | 20.5 | 14.0 | 31.7 |
| 1.6 | 160 | 18.8 | 10.8 | 42.5 |
| 2.4 | 151 | 18.8 | 9.3 | 50.5 |

It is seen that the addition of nitric acid increased the extractability of the ferric nitrate, but that this effect tended to level out.

Example 3

The relative efficacy of calcium chloride on iron derived from ferric sulfate, ferric nitrate and ferric chloride was measured for aqueous solutions which were saturated with calcium chloride.

| Compound | Fe Concentration, Original | gms./liter, Final | Percent Extracted |
|---|---|---|---|
| $Fe_2(SO_4)_3$ | 25.4 | 1.9 | 91.5 |
| $Fe(NO_3)_3$ | 22.4 | .22 | 99.11 |
| $FeCl_3$ | 22.4 | .01 | 99.95 |

Thus, while ferric chloride is more readily extracted than other iron salts, when saturated calcium chloride is used, a quantitative separation may be achieved with both ferric nitrate and ferric sulfate.

Example 4

A natural Georgia kaolin (clay) was calcined in a muffle-type furnace and dissolved in nitric acid. Insoluble matter was filtered out. The iron content was extracted by methyl isobutyl ketone and halide compounds such as chlorides, bromides, iodides and fluorides.

The following amounts of iron were extracted by methyl isobutyl ketone on the addition of halide compounds to a solution of the clay in 5 normal nitric acid:

| Halide Compound Added | Percent wt. Iron Extracted |
|---|---|
| Barium Chloride | 10.3 |
| Lithium Chloride | 99.9 |
| Sodium Bromide | 99.3 |
| Sodium Fluoride | 25.0 |
| Ammonium Bifluoride | 17.0 |
| Potassium Bromide | 89.3 |
| Potassium Iodide | 77.5 |

Example 5

The following amounts of iron were extracted by methyl isobutyl ketone on the addition of halide compounds to a neutral (containing no acid) solution prepared by dissolving the iron compound in water.

| Iron Compound | Halide Compound Added | Percent wt. Iron Extracted |
|---|---|---|
| Ferric Chloride | Sodium Chloride | 66.5 |
| | Potassium Chloride | 27.2 |
| | Ammonium Chloride | 51.8 |
| | Calcium Chloride | 99.9 |
| Ferric Sulphate | Sodium Fluoride | 92.0 |
| | Potassium Bromide | 82.0 |
| | Ammonium Bifluoride | 89.0 |

*Example 6*

The following amounts of iron were extracted by carbon tetrachloride on the addition of halide compounds to a solution prepared by dissolving iron and aluminum compounds in water (0.1 molar $H_2SO_4$ solution)

| Iron Compound | Halide Compound Added | Percent wt. Iron Extracted |
|---|---|---|
| Ferric Sulphate | Sodium Fluoride | 77.0 |
| Do | Potassium Bromide | 17.0 |

All of these examples represent only a single pass. If the passes are repeated the percentage of extraction per pass will remain substantially the same, so that quantitative removal of the iron can be effected with sufficient passes of fresh solvent.

The present invention may be embodied in other specific forms without departing from the spirit or essential attributes thereof, and accordingly, reference should be made to the appended claims, rather than to the foregoing specification as indicating the scope of the invention.

I claim:

1. A process for the recovery of an iron-free aluminum compound from a clay or like silicate mineral containing chemically combined iron which comprises contacting said mineral with a 0.1 to 5 molar aqueous nitric acid solution, dissolving iron and aluminum into said acid solution, filtering off undissolved silica, adding calcium chloride to said acid solution in sufficient amount to saturate said acid solution with such calcium chloride, extracting the iron from said acid solution by dissolving the iron in methyl isobutyl ketone, and retaining all of the aluminum dissolved in the nitric acid solution.

2. A process for the recovery of an iron-free aluminum compound from a clay or like silicate mineral containing chemically combined iron which comprises contacting said mineral with a 0.1 to 5 molar aqueous nitric acid solution, dissolving iron and aluminum into said acid solution, filtering off undissolved silica, adding a water-soluble inorganic halide salt to said acid solution in sufficient amount to saturate said acid solution with such water-soluble inorganic halide salt, extracting the iron from said acid solution by dissolving the iron in a ketone, and retaining all of the aluminum dissolved in the nitric acid solution.

3. A process in accordance with claim 2 in which the ketone is methyl isobutyl ketone.

4. A process in accordance with claim 2 in which the ketone is methyl butyl ketone.

5. A process for the recovery of an iron-free aluminum compound from a clay or like silicate mineral containing chemically combined iron which comprises contacting said mineral with a nitric acid solution, dissolving iron and aluminum from said mineral into the nitric acd solution, filtering off undissolved silica, adding a water-soluble inorganic halide salt to said nitric acid solution, extracting the iron from said nitric acid solution by dissolving the iron in a water-soluble organic solvent consisting of a ketone, separating the iron-containing solvent, and retaining all of the aluminum dissolved in the nitric acid solution.

References Cited in the file of this patent

UNITED STATES PATENTS

| 1,897,740 | Teller | Feb. 14, 1933 |
| 1,953,144 | Wilson | Apr. 3, 1934 |
| 2,249,761 | Hixson et al. | July 22, 1941 |
| 2,376,696 | Hixson et al. | May 22, 1945 |

FOREIGN PATENTS

| 246,827 | Great Britain | Dec. 9, 1926 |